United States Patent
Kim

(10) Patent No.: US 11,938,847 B2
(45) Date of Patent: Mar. 26, 2024

(54) STEPLESS BRAKE DEVICE OF VEHICLE SEAT

(71) Applicant: DAS CO., LTD, Gyeongju-si (KR)

(72) Inventor: Jae Ho Kim, Suwon-si (KR)

(73) Assignee: DAS CO., LTD, Gyeongju-si (KR)

( * ) Notice: Subject to any disclaimer, the term of this patent is extended or adjusted under 35 U.S.C. 154(b) by 2 days.

(21) Appl. No.: 17/853,378

(22) Filed: Jun. 29, 2022

(65) Prior Publication Data
US 2023/0012323 A1     Jan. 12, 2023

(30) Foreign Application Priority Data

Jun. 30, 2021 (KR) .......................... 10-2021-0085911

(51) Int. Cl.
*B60N 2/16* (2006.01)
*B60N 2/18* (2006.01)

(52) U.S. Cl.
CPC ............. *B60N 2/168* (2013.01); *B60N 2/165* (2013.01); *B60N 2/1685* (2013.01); *B60N 2/1864* (2013.01); *B60N 2/1889* (2013.01); *B60N 2/1892* (2013.01)

(58) Field of Classification Search
None
See application file for complete search history.

(56) References Cited

U.S. PATENT DOCUMENTS

| | | | | |
|---|---|---|---|---|
| 2005/0056518 A1* | 3/2005 | Weber | ................... | B60N 2/938 297/367 R |
| 2012/0305359 A1* | 12/2012 | Sato | ..................... | B60N 2/167 192/41 S |
| 2016/0375801 A1* | 12/2016 | Ikeda | ..................... | B60N 2/168 74/89.18 |
| 2018/0290576 A1* | 10/2018 | Schwarzbich | ....... | B60N 2/1889 |
| 2019/0210489 A1* | 7/2019 | Sato | ..................... | B60N 2/938 |
| 2022/0363167 A1* | 11/2022 | Fujita | ..................... | B60N 2/236 |
| 2023/0001828 A1* | 1/2023 | Teraguchi | .............. | B60N 2/236 |
| 2023/0264608 A1* | 8/2023 | Kim | ..................... | B60N 2/938 296/65.16 |

FOREIGN PATENT DOCUMENTS

| | | |
|---|---|---|
| JP | 2015117764 | 6/2015 |
| JP | 2019127263 | 8/2019 |
| KR | 20140053073 | 5/2014 |
| KR | 20210067586 | 6/2021 |

* cited by examiner

*Primary Examiner* — David E Allred
(74) *Attorney, Agent, or Firm* — TAROLLI, SUNDHEIM, COVELL & TUMMINO L.L.P.

(57) ABSTRACT

The present disclosure relates to a stepless brake device of a vehicle seat. The coupling piece formed on the plate cover disposed on the outermost rear surface is caulked and coupled to the housing cover disposed on the outermost front side. Therefore, the components are firmly coupled, and no axial gap occurs between the components. Also, tolerance accumulation of the components does not occur, so that the tilt of the roller is reduced, and thus, collision noise of the roller during the release operation is prevented.

5 Claims, 12 Drawing Sheets

[FIG. 1]
[PRIOR ART]
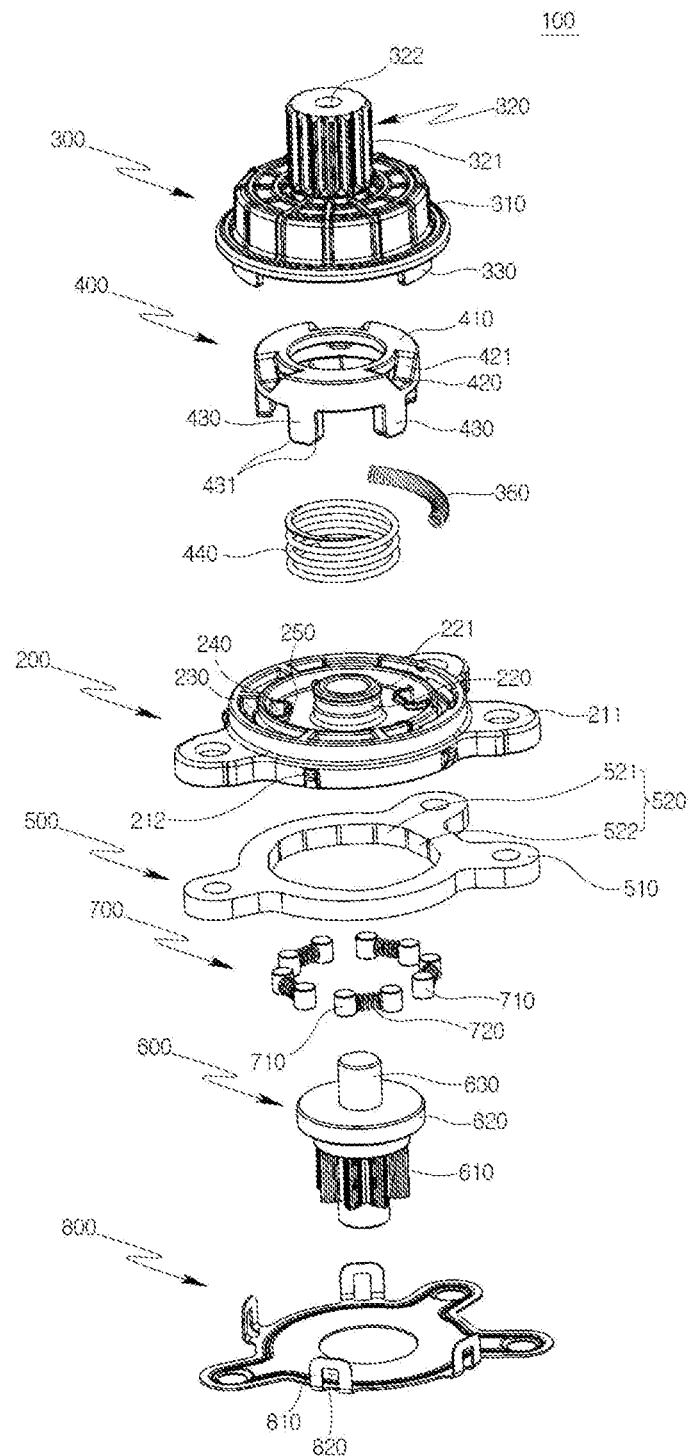

[FIG. 2]
[PRIOR ART]
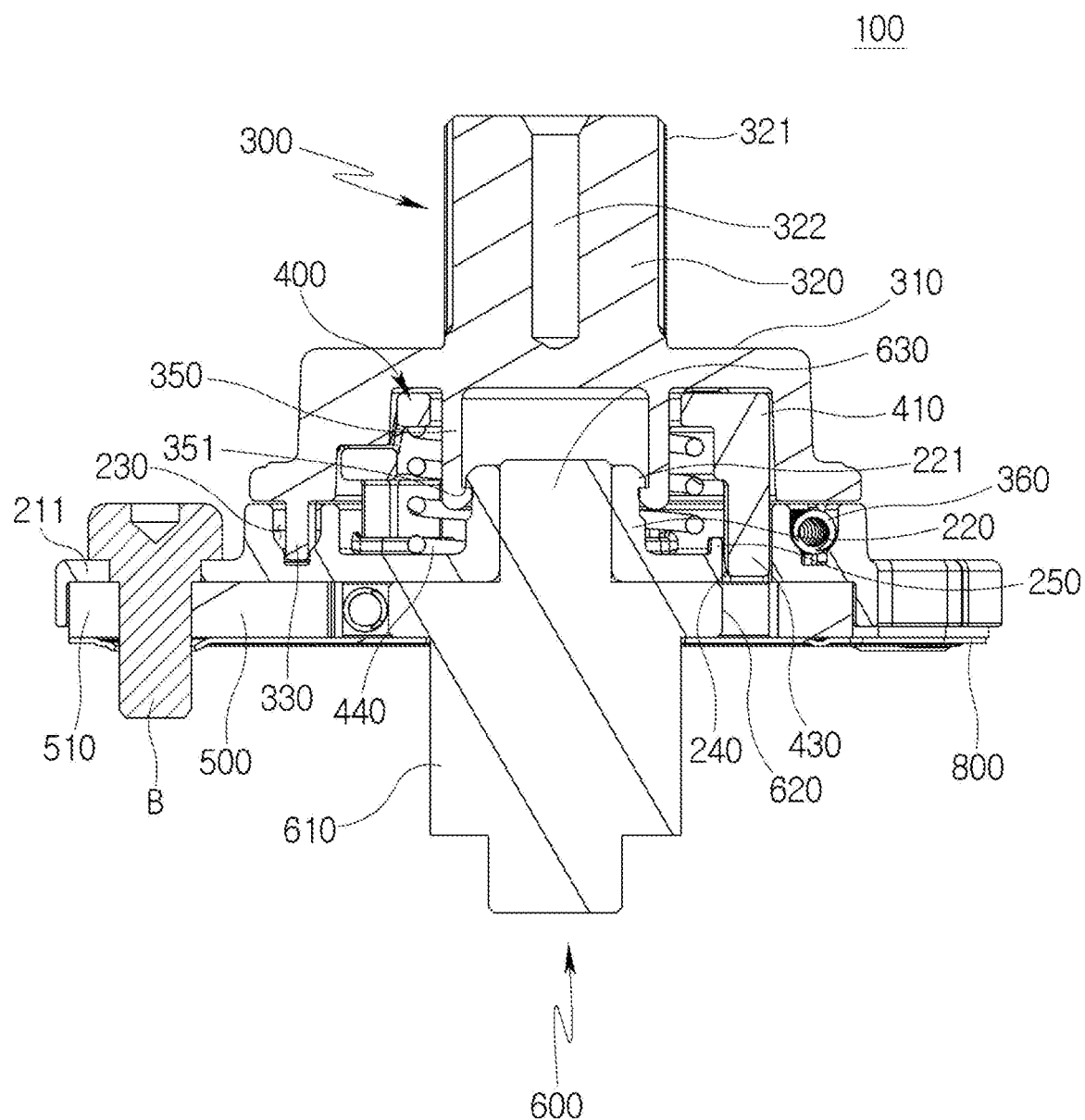

[FIG. 3]
[PRIOR ART]
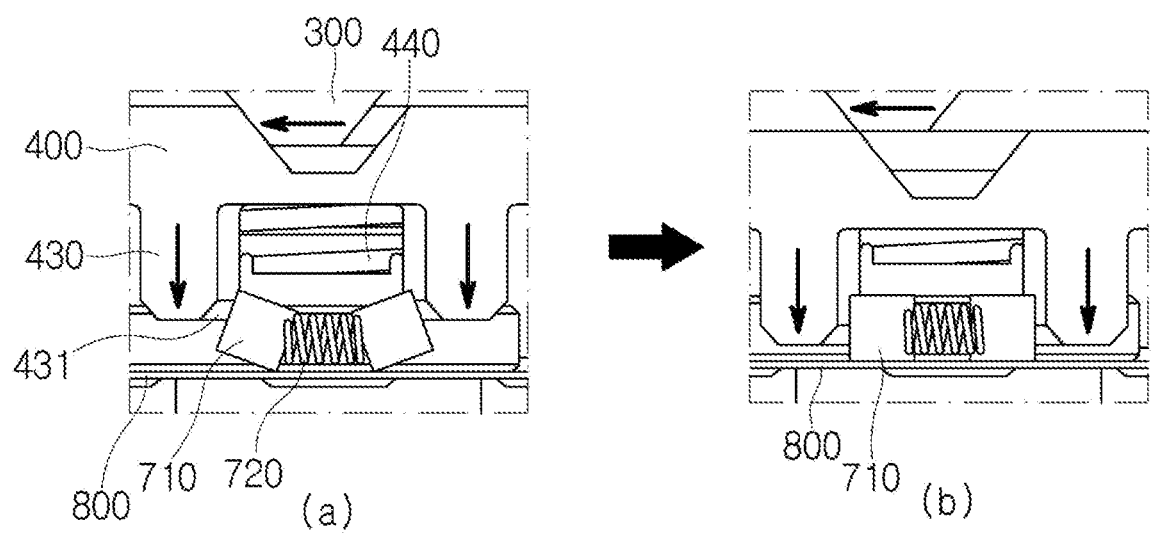

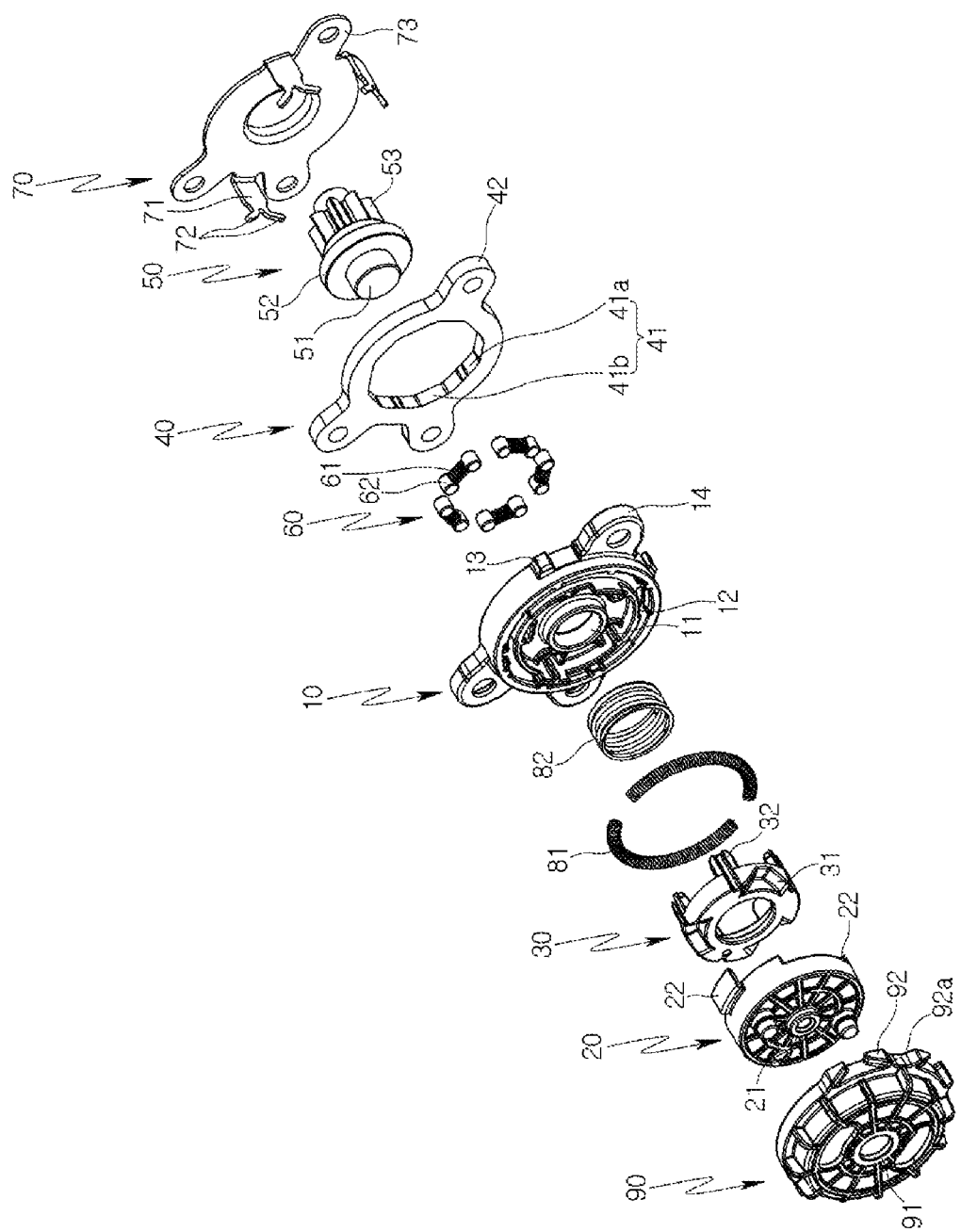
[FIG. 4]

[FIG. 5]
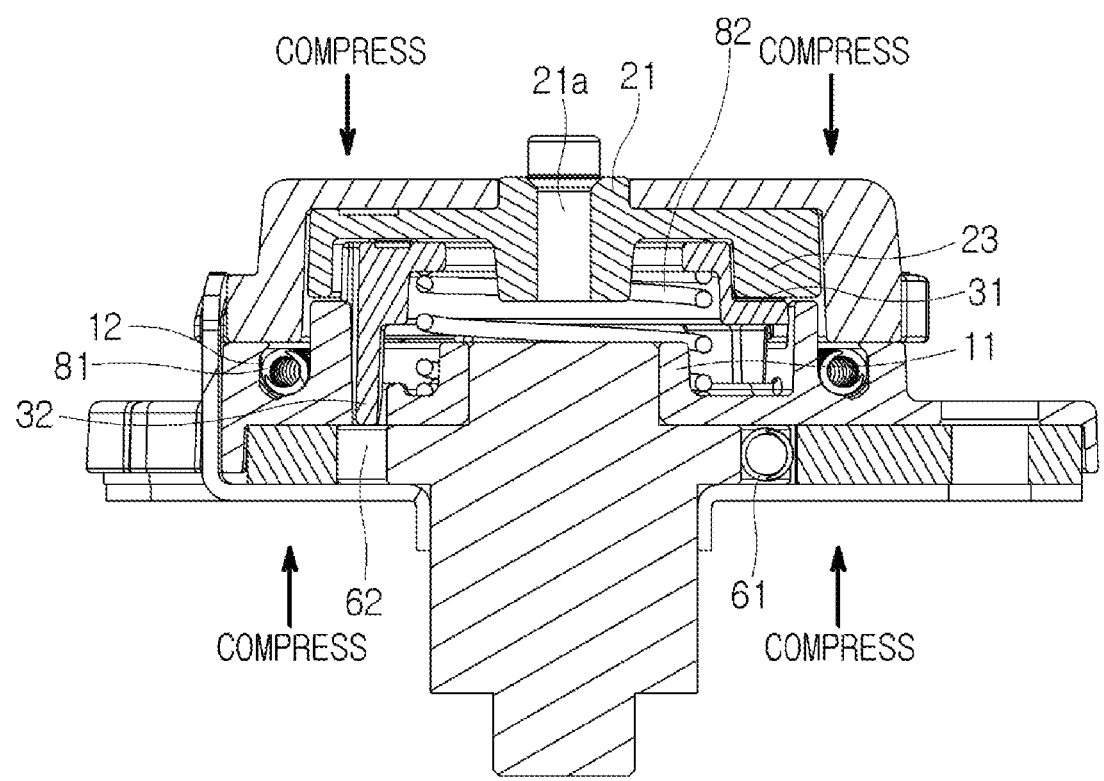

[FIG. 6]
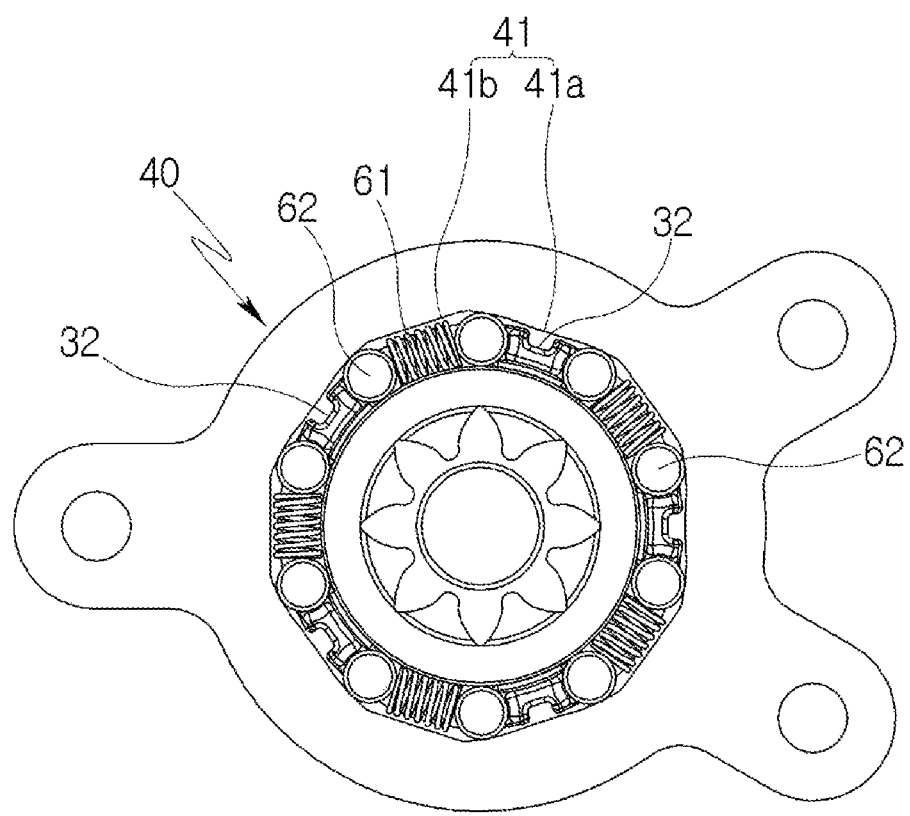

[FIG. 7]
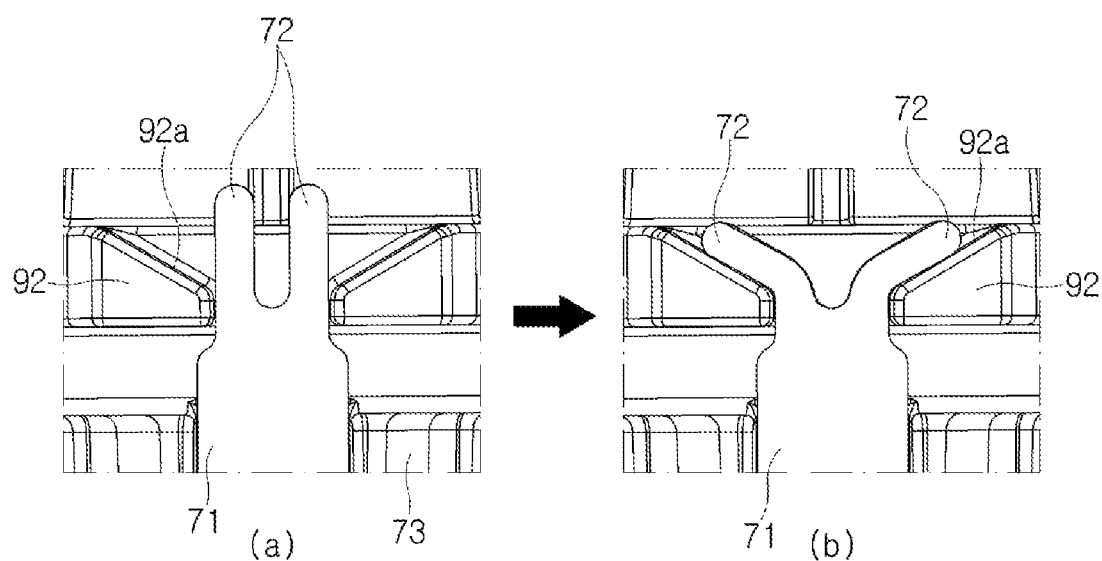

[FIG. 8]
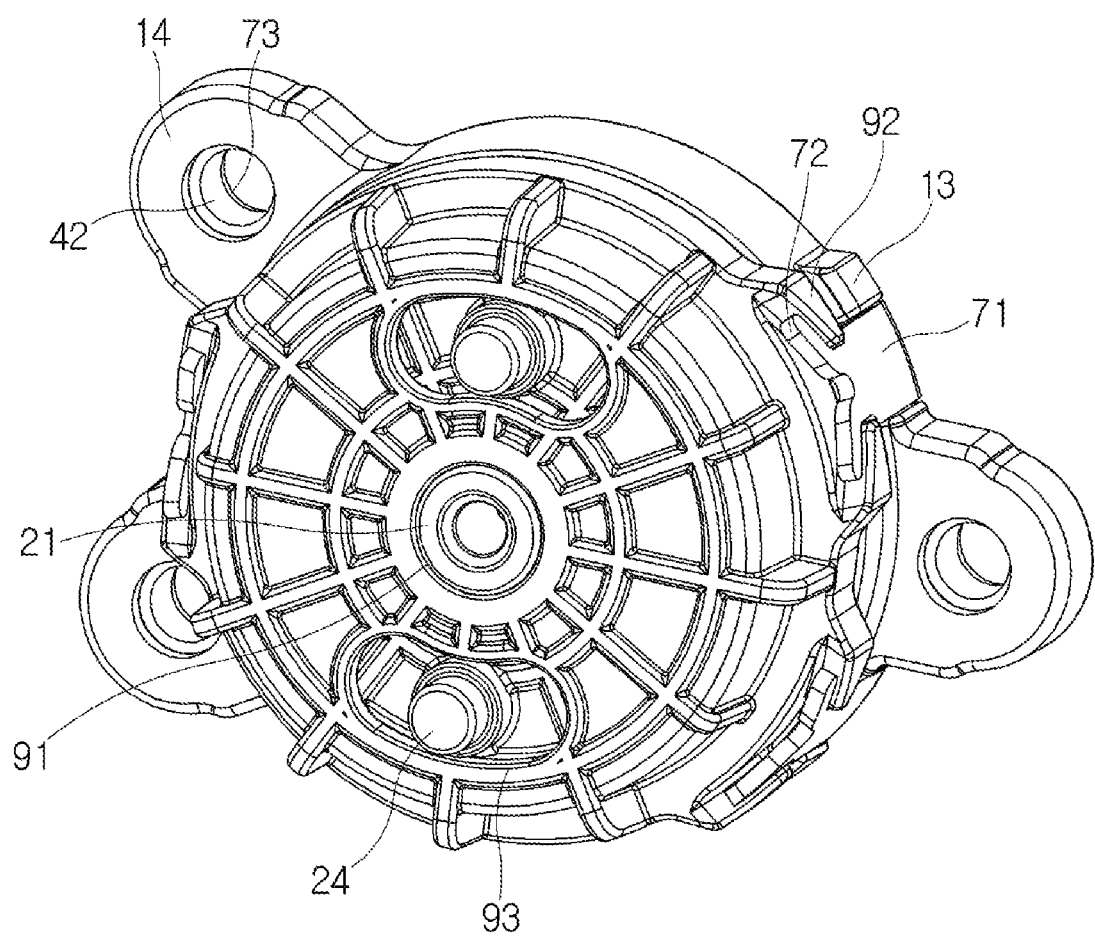

[FIG. 9]
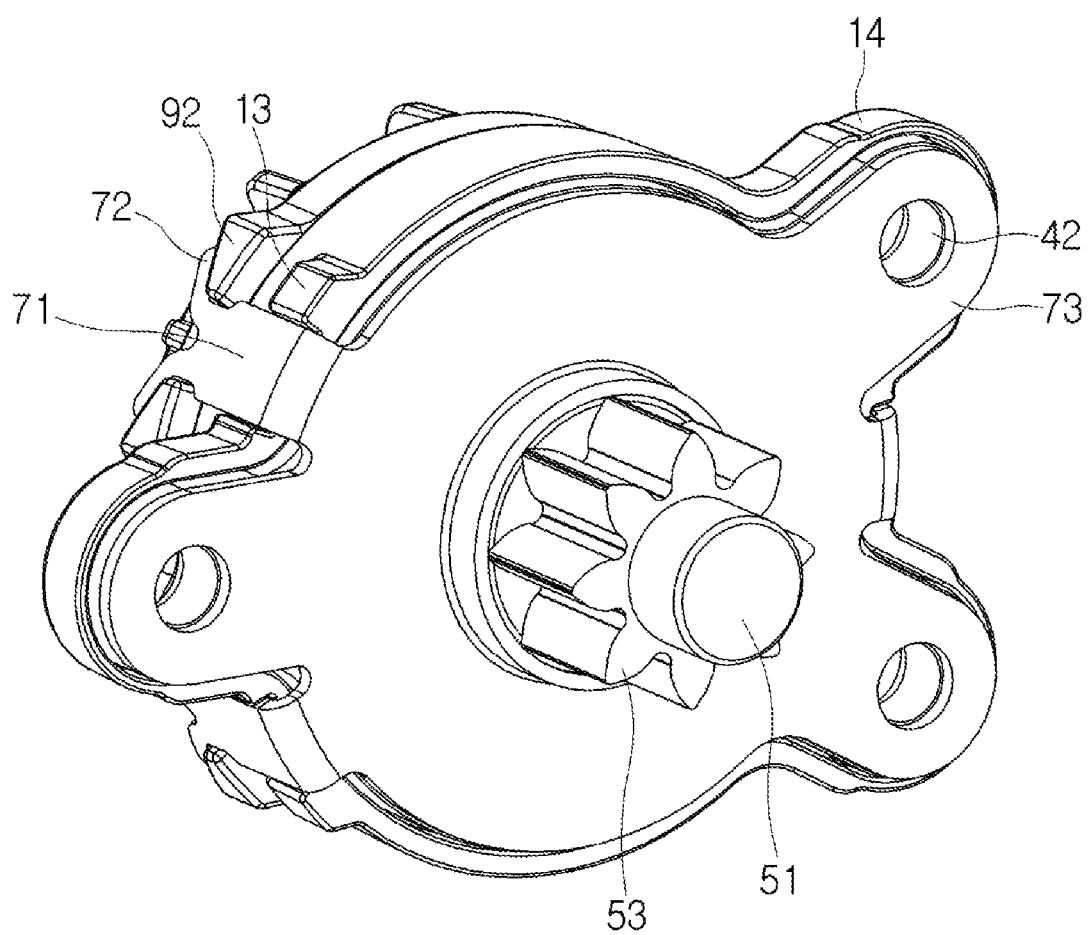

[FIG. 10]
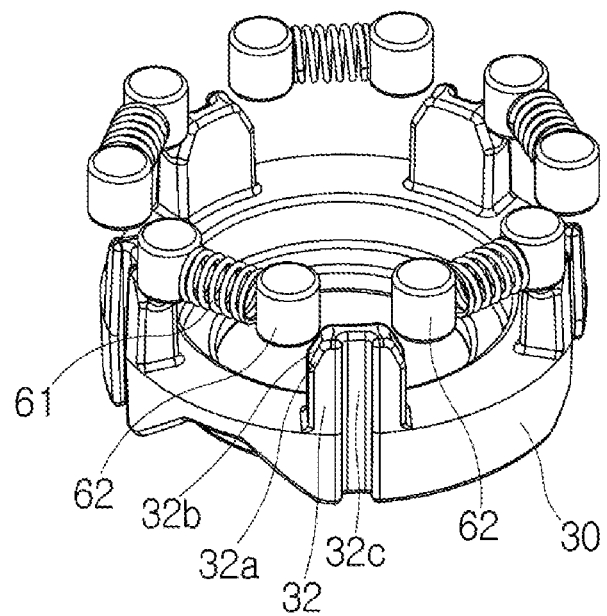

[FIG. 11]
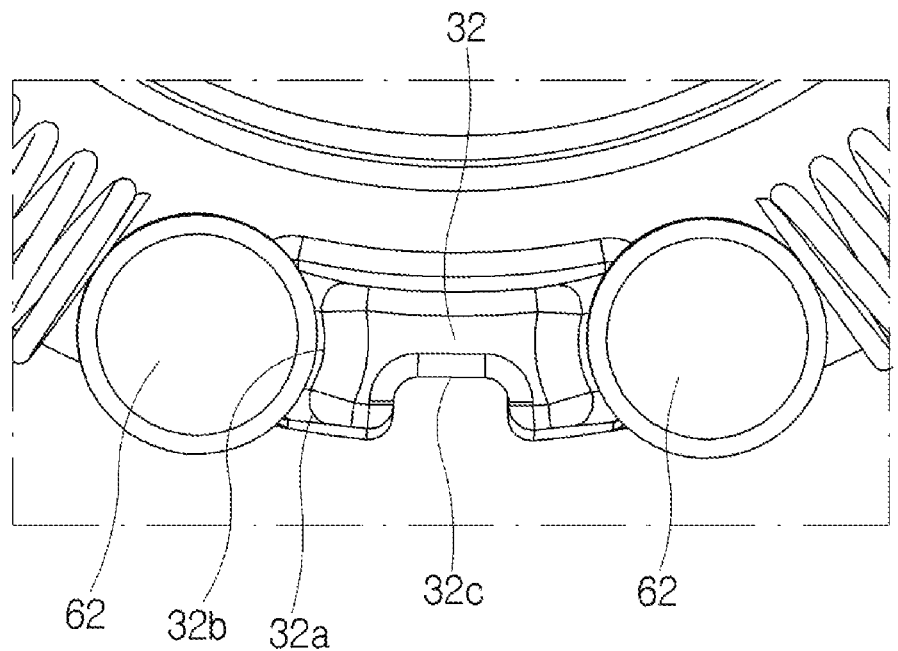

[FIG. 12]
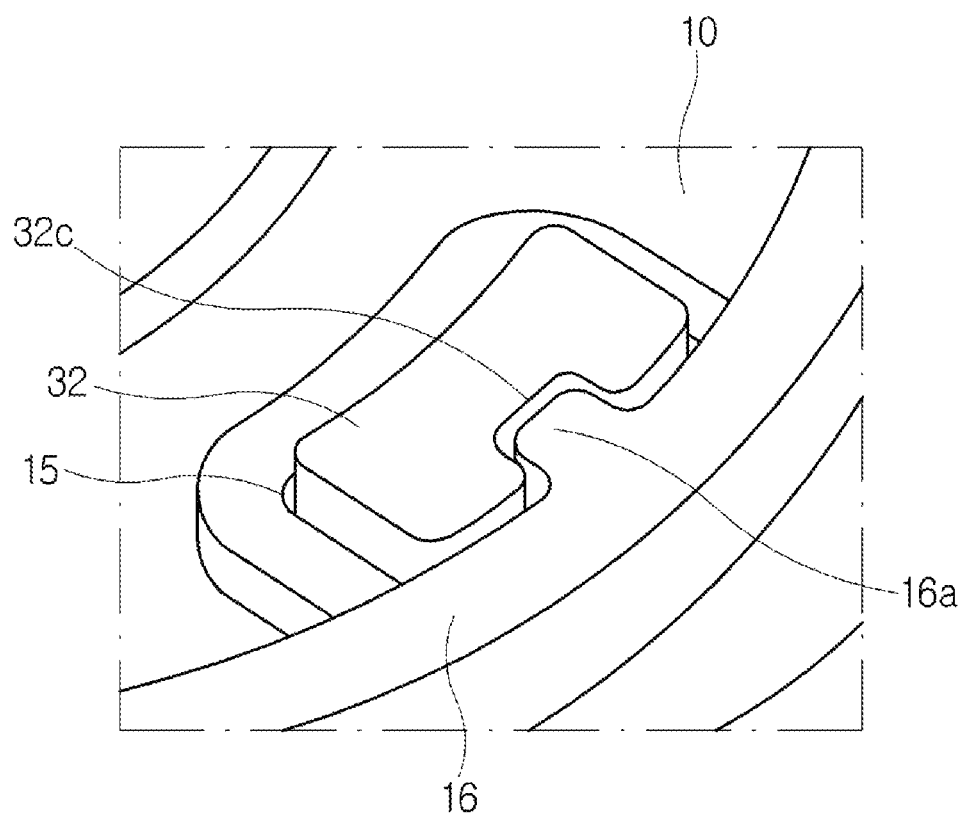

STEPLESS BRAKE DEVICE OF VEHICLE SEAT

CROSS-REFERENCE TO RELATED APPLICATIONS

The present application claims priority to Korean Patent Application No. 10-2021-0085911, filed Jun. 30, 2021, the entire contents of which is incorporated herein for all purposes by this reference.

BACKGROUND

Field

The present disclosure relates to a stepless brake device installed on a vehicle seat and more particularly to a stepless brake device of a vehicle seat, which is capable of maintaining or releasing a locked state of a height-adjustable seat.

Description of the Related Art

A stepless brake device of a vehicle seat is a part of a seat height adjusting device. The seat is provided with a seat upward movement means and is configured to always move upward unless an external force is applied downward in a lock release state. It is the stepless brake device that maintains the seat in a locked state and releases the locked state as necessary in response to the operation of the seat upward movement means and the weight of a passenger.

A stepless brake device according to a prior art includes, as shown in FIG. 1, a housing 200, an input unit 300, a controller 400, a fixing portion 500, a brake unit 600, a braking member 700, and a plate cover 800.

The input unit 300 is rotatably coupled to one side of the housing 200. The controller 400 is installed between the housing 200 and the input unit 300 in such a way as to be elastically supported in an axial direction by a spring 440. An operating lever is installed on the input unit 300 and the passenger is able to perform a rotation operation.

The fixing portion 500 and the plate cover 800 are coupled to the other side of the housing 200 and are fixed to a side portion of a cushion frame of the seat by a bolt.

The brake unit 600 having a tooth part 610 formed therein is installed between the housing 200 and the plate cover 800. The braking member 700 including a roller 710 and an elastic member 720 is provided between a brake surface 620 of the brake unit 600 and an inner peripheral surface 520 of the fixing portion 500.

A wedge inclined surface 521 and a static friction surface 522 are formed on the inner peripheral surface 520 of the fixing portion 500, so that the rotation of the brake unit 600 is restricted or released according to the position of the roller 710.

Meanwhile, when the input unit 300 is rotated, the controller 400 moves toward the housing 200 while compressing the spring 440 due to an inner contact shape thereof. Here, a control protrusion 430 of the controller 400 pushes the roller 710 in a circumferential direction of the inner peripheral surface 520 of the fixing portion 500, so that the roller 710 moves from the static friction surface 522 to the wedge inclined surface 521, and then the restriction of the brake unit 600 by the roller 710 is released.

Therefore, the seat becomes a state in which the seat can be raised by a seat-raising means. In this state, if the passenger lifts his/her hip, the seat moves up and the height of the seat increases. If the passenger sits with his/her weight on, the seat moves down and the height of the seat decreases. In this way, the height of the seat can be adjusted.

When the operating lever is released after adjusting the seat height, the input unit 300 returns to its original position, and the control unit 400 hereby returns to the input unit 300, so that the roller 710 returns to the static friction surface 522 and restricts the brake unit 600, and thus, the brake unit 600 is in a non-rotating fixed state.

The teeth part 610 formed on one side of the body of the brake unit 600 meshes with a rack gear interlocked with the seat-raising means. Therefore, when the rotation of the brake unit 600 is restricted as described above, the seat raising means cannot be operated either, so that the seat is in the locked state where the up-and-down movement of the seat cannot be performed. Accordingly, the height of the seat adjusted by the passenger can be maintained constant.

On the other hand, in the conventional stepless brake device described above, since the input unit 300 is, as shown in FIG. 2, coupled to the housing 200 by hook structures 221 and 351, there is a weak coupling strength between the input unit 300 and the housing 200, so there is a problem that a separation strength of the input unit 300, that is, a separation strength of the operating lever is reduced.

In addition, since the plurality of components such as the fixing unit 500, the housing 200, the controller 400, the input unit 300, etc., are coupled in a structure in which they are stacked in the axial direction, dimensional tolerances of the components are accumulated, and even a dimensional tolerance of the bolt B that couples the housing 200 and the fixing portion 500 is added. Accordingly, the components cannot be coupled accurately and strongly, so gaps between the components are highly likely to be excessively created, and as a result, axial flow is generated in the operating lever.

In addition, due to the described-above occurrence of the gap between the components, flow is generated in the roller 710 in the assembled state, and accordingly, as shown in FIG. 3, the roller 710 is tilted while being pushed by an inclined surface 431 of the control protrusion 430 at the initial stage of the release operation (see (a) of FIG. 3). Then, when the release operation is completed, the roller 710 collides with the plate cover 800 while returning to a steady-state, so that collision noise "click" is generated (see (b) of FIG. 3). That is, there is a problem that, whenever a user operates the stepless brake device in order to adjust the height of the seat, the operation noise is generated.

PRIOR ART DOCUMENT

Patent Document (Patent Document 1) Korean Patent No. 2021-0067586 (Jun. 8, 2021)

SUMMARY

Technical Problem

The present invention is designed to solve the above-described problems. The purpose of the present invention is to provide a stepless brake device of a vehicle seat in which the separation strength of the operating lever is improved, the operating lever does not flow in the axial direction, and the operation noise is not generated when the release operation is performed.

Technical Solution

One embodiment is a stepless brake device of a vehicle seat. An input member and an unlock member are disposed on one side of a housing, and a braking member, a fixing member, and a gear member are disposed on the other side of the housing. A housing cover surrounding the input member is disposed on the one side of the housing. A plate cover preventing separation of the braking member and the gear member is disposed on the other side of the housing. A plurality of coupling pieces formed on the plate cover is caulked and coupled to the housing cover in a state where the housing cover and the plate cover are compressed in a direction toward each other.

A pair of caulking protrusions is formed on an end portion of the coupling piece. A pair of catching protrusions of which the number is the same as that of the coupling pieces is formed on an outer peripheral surface of the housing cover. A catching surface is formed to be inclined on inner side portions of both side catching protrusions consisting of a pair with each other. The coupling piece is inserted between said both side catching protrusions, is caulked in a direction in which said both side catching protrusions spread, and is caught by a corresponding catching surface.

A protrusion by which the coupling piece is caught in a circumferential direction is formed on an outer peripheral surface of the housing.

The unlock member has a plurality of unlock protrusions formed around a body thereof in an axial direction thereof. Corners on both sides of an end portion of the unlock protrusion are formed as inclined surfaces. An inwardly concave round groove is formed in each of the inclined surfaces.

A straight guide groove is formed in an outer surface of the unlock member in an operation direction of the unlock member. A straight guide protrusion which is inserted into the guide groove is formed on an inner surface of a border portion of the housing.

A stopper protrusion is formed on a front side of the input member. An arc-shaped stopper hole is formed in a front side of the housing cover. The stopper protrusion is inserted into the stopper hole, so that a rotation range of the input member is limited.

A wedge surface is formed on an inner peripheral surface of the fixing member in such a way as to have a radius that is relatively short from a center of the inner peripheral surface. A release surface is formed in such a way as to have a radius that is relatively long with respect to the wedge surface. The wedge surface and the release surface are formed continuously and repeatedly.

Advantageous Effects

According to the present invention as described above, in a state where all the components are compressed in the axial direction, the coupling piece of the plate cover is caulked to the housing cover and is assembled. Therefore, the coupling strength of the input unit is improved, and thus, the separation strength of the operating lever is enhanced.

Also, since a gap between the components is not created by the above-mentioned assembly method, the axial flow of the operating lever is prevented.

Also, the roller flow is prevented for the same reason, and thus, the roller is not tilted during the release operation. Therefore, noise generated when the roller collides with the plate cover is prevented.

BRIEF DESCRIPTION OF THE DRAWINGS

FIG. 1 is an exploded perspective view of a stepless brake device of a vehicle seat according to a prior art;

FIG. 2 is a cross sectional view showing an assembly state of FIG. 1;

FIG. 3 is a view describing in (a) and (b) the movement of a roller that produces collision noise during a release operation;

FIG. 4 is an exploded perspective view of a stepless brake device of a vehicle seat according to an embodiment of the present invention;

FIG. 5 is a cross-sectional view showing an assembly state of FIG. 4;

FIG. 6 is a bottom view of FIG. 5 and is a state view without a plate cover;

FIG. 7 is a view showing in (a) and (b) a coupling structure of the plate cover and a housing cover;

FIG. 8 is an exploded front perspective view of the stepless brake device according to the embodiment of the present invention;

FIG. 9 is a rear perspective view of the stepless brake device according to the embodiment of the present invention;

FIG. 10 is a perspective view showing an unlock member and a braking member which are components of the present invention;

FIG. 11 is a view enlarging an unlock protrusion and both side rollers contacting the unlock protrusion; and FIG. 12 is a cross-sectional view of an assembly part of the unlock protrusion and the housing.

DETAILED DESCRIPTION

As the present invention can have various embodiments as well as can be diversely changed, specific embodiments will be illustrated in the drawings and described in detail. While the present invention is not limited to particular embodiments, all modification, equivalents and substitutes included in the spirit and scope of the present invention are understood to be included therein. The thickness of lines or the size of the component, etc., shown in the accompanying drawings may be exaggerated for clarity and convenience of description.

Also, the below-mentioned terms are defined in consideration of the functions in the present invention and may be changed according to the intention of users or operators or judicial precedents. Therefore, definitions of such terms should be made based on what has been described throughout the present specification.

Hereinafter, embodiments of the present invention will be described in detail with reference to the accompanying drawings.

As shown in FIGS. 4 to 6, a stepless brake device of a vehicle seat according to the embodiment of the present invention includes a housing 10, an input member 20, an unlock member 30, a fixing member 40, a gear member 50, a braking member 60, a plate cover 70, and a housing cover 90.

Based on the housing 10, a release operation unit including the input member 20, the unlock member 30, etc., is on one side, and a brake unit including the fixing member 40, the gear member 50, the braking member 60, etc., is on the other side.

The release operation unit serves to release a locked state of the brake unit in accordance with user's operation of an operating lever (not shown), and the brake unit maintains the locked state against the weight of the user and a seat upward movement means, thereby serving to maintain the height of the seat to an immediately preceding adjusted height.

The plate cover 70 and the housing cover 90 are disposed on the outermost side of the stepless brake device and receive components constituting the release operation unit and the brake unit therebetween, and prevent the components from being separated to the outside.

The input member 20 is an approximately cylindrical component, and a center boss 21 has a mounting hole 21a formed therein, in which the operating lever can be mounted through a fastening means such as a bolt. On the outer peripheral surface of the input member, catching portions 22 are formed to protrude from positions opposite to each other. After the rotation operation is performed by the operating lever, the catching portions 22 can return to their original positions by a first spring 81.

The unlock member 30 is inserted into the input member 20 and is interworked with the rotation operation of the unlock member 30 to operate forward and backward in the axial direction. To this end, a trapezoidal sliding groove 31 is formed in the top surface of the unlock member 30, and correspondingly, a trapezoidal sliding protrusion 23 is formed within the input member 20. In the assembled state, the sliding protrusion 23 is inserted into the sliding groove 31, and therefore, when the input member 20 is rotated, an inclined surface of the sliding protrusion 23 and an inclined surface of the sliding groove 31 slip each other, so that the unlock member 30 moves forward toward the housing 10 while compressing a second spring 82.

A plurality of unlock protrusions 32 are formed to protrude toward the housing 10 at regular intervals along the circumferential direction of the unlock member 30.

A cylindrical center boss 11 is formed to protrude from the front surface of the housing 10, and one end of the second spring 82 is fitted to the outer periphery of the center boss 11. In this state, the other end of the second spring 82 elastically supports the unlock member 30.

A pair of left and right first springs 81 is provided, and a spring groove 12 in which the first spring 81 is inserted and seated along the circumferential direction is formed in the front outer portion of the housing 10. The catching portion 22 of the input member 20 is caught by the end of the first spring 81, and when the input member 20 is rotated by operating the operating lever and the first spring 81 is compressed and an operating force of the operating lever is removed, the input member 20 is designed to return to its original position by a restoring force of the first spring 81.

The fixing member 40 forms a space in which the braking member 60 is installed and operated together with the gear member 50.

The fixing member 40 is disposed in close contact with the other side (rear surface) of the housing 10, and a wedge surface 41a and a release surface 41b are continuously and repeatedly formed on an inner peripheral surface 41 in the circumferential direction. The wedge surface 41a has a radius from the center of the inner peripheral surface 41 that is relatively smaller than that of the release surface 41b, and the release surface 41b has a radius from the center of the inner peripheral surface 41 that is relatively greater than that of the wedge surface 41a.

The gear member 50 has a disk-shaped brake part 52 formed on one side of the outer periphery of a shaft 51, and a pinion gear 53 is formed on one side of the brake part. The pinion gear 53 meshes with a rack gear that is interworked with a seat-raising means.

One end of the shaft 51 of the gear member 50 is inserted and seated in a through-hole of the center boss 11 of the housing 10 through the fixing member 40. Here, the brake part 52 of the gear member 50 is positioned within a through-hole of the fixing member 40. Accordingly, a braking member 60 installation and operation space is formed between the inner peripheral surface 41 of the through-hole of the fixing member 40 and the outer peripheral surface of the brake part 52 of the gear member 50.

A plurality of braking members 60 are inserted and installed in the braking member 60 installation and operation space. One braking member 60 is composed of a spring 61 and rollers 62 disposed on both ends of the spring 61. The spring 61 is disposed in the center of the release surface 41b of the inner peripheral surface 41 of the fixing member 40 and the rollers 62 are disposed to be in contact with both ends of the spring.

In a normal state where the operating force by a passenger is not applied, the stepless brake device is in a locked state. The rollers 62 on both ends are pushed by the spring 61 and fitted between the outer peripheral surface of the brake part 52 and the wedge surface 41a. As such, all the rollers 62 are positioned on the wedge surface 41a and fix the brake part 52, so that the gear member 50 is maintained in a state where the gear member 50 is not able to rotate.

The plate cover 70 is installed in close contact with the other side of the fixing member 40. The pinion gear 53 of the gear member 50 may protrude to the opposite side through a through-hole of the plate cover 70 and mesh with the rack gear, and the brake part 52 may be caught around the through-hole of the plate cover 70. Accordingly, separation of the gear member 50 and the braking member 60 is prevented by the plate cover 70.

Meanwhile, the housing cover 90 is disposed on the front side of the input member 20. The housing cover 90 has a circular container shape with one side closed, and the input member 20 is inserted and seated on one side of the open side of the housing cover 90.

A boss hole 91 in which the center boss 21 of the input member 20 is inserted and seated is formed in the front side of the housing cover 90. The center boss 21 is exposed to the outside of the housing cover 90 through the boss hole 91, so that the operating lever can be mounted.

A plurality of coupling pieces 71 bent and extended toward the housing cover 90 is formed on the plate cover 70. Two caulking protrusions 72 spaced apart from each other by a predetermined distance are, as shown in (a) of FIG. 7, formed to protrude from the end of the coupling piece 71.

In response to the caulking protrusion 72, pairs of catching protrusions 92 spaced apart from each other by the same distance as that between the coupling pieces 71 are formed on the outer peripheral surface of the housing cover 90 in such a way as to have the same number as the coupling pieces 71. Catching surfaces 92a having inclined surface shapes facing each other are formed on both side catching protrusions 92 of each of the pairs of catching protrusions 92.

After the other parts are, as shown in FIG. 5, assembled, the plate cover 70 and the housing cover 90 are compressed in a direction toward each other. In this state, the caulking projection 72 is caulked and spreads in both directions and is caught by the catching protrusion 92 of the housing cover 90 (see (b) of FIG. 7). The plate cover 70 is made of a metal material. The plate cover 70 is plastically deformed by caulking and maintains the spreading in both directions. Accordingly, the state of being caught by the catching surface 92a is firmly and stably maintained.

Here, since the coupling piece 71 is inserted between both side catching protrusions 92, the relative movement in the circumferential direction between the plate cover 70 and the housing cover 90 is also prevented. In addition, a protrusion 13 is also formed on the outer peripheral surface of the housing 10 so that the coupling piece 71 is caught in the circumferential direction. As a result, the housing 10, the plate cover 70, and the housing cover 90 are securely coupled to each other without flowing in the circumferential direction.

The front and rear perspective views of the stepless brake device assembled as described above are shown in FIGS. 8 and 9.

In the housing 10, the fixing member 40, and the plate cover 70, a plurality of mounting parts 14, 42, and 73 protruding outward in a radial direction is formed at the same position as each other. A bolt hole is formed in each of the mounting parts 14, 42, and 73, the bolt holes coincide with each other during the assembly thereof.

Therefore, the mounting parts 14, 42, and 73 can be mounted on a cushion frame of the seat by using the bolt.

A pair of stopper protrusions 24 spaced apart from the center boss 21 by the same distance in the radial direction are formed on the input member 20. The stopper protrusions 24 are formed opposite to each other with respect to the center boss 21.

A stopper hole 93 into which the stopper protrusion 24 is inserted is formed in the housing cover 90. The stopper hole 93 is formed in an arc shape having a predetermined length on the same circumference centered on the boss hole 91. Since the stopper protrusion 24 is movable only within the stopper hole 93, the rotation angle of the input member 20 is limited within a range of a circumferential length of the stopper hole 93. That is, the operating range of the operating lever is limited within a certain range, so that unnecessary excessive operation of the operating lever is prevented, and thus the forward and return movement of the unlock member 30 can be smoothly and stably performed.

Meanwhile, as shown in FIGS. 10 and 11, the unlock protrusion 32 of the unlock member 30 is formed in the same number as the braking member 60 and is positioned between the braking members 60.

The end of the unlock member 30 is formed in a shape in which the width becomes narrower toward the end in order that the end of the unlock member 30 is easily inserted between the rollers 62 of both side braking members 60. That is, corners on both sides of the end are formed as inclined surfaces 32a.

Also, in the inclined surface 32a, a round groove 32b having a radius of curvature equal to or slightly larger than the radius of curvature of the outer peripheral surface of the roller 62 is concavely formed in an inside direction of the inclined surface 32a.

In addition, as shown in FIG. 12, a straight guide groove 32c is formed in the outer surface of the unlock protrusion 32 (a radially outer surface of the unlock member 30) in an operation direction of the unlock protrusion 32. Also, it goes without saying that the guide groove 32c may be formed to extend over the entire body of the unlock member 30.

A straight guide protrusion 16a is formed to protrude in the axial direction of the housing 10 on the inner peripheral surface of a body border portion 16 of the housing 10 in response to the guide groove 32c.

In the assembled state, the guide protrusion 16a is inserted into the guide groove 32c of the unlock protrusion 32 and guides the linear movement of the unlock member 30.

In FIG. 12, an undescribed reference numeral 15 represents a protrusion hole 15 through which the unlock protrusion 32 passes. The unlock protrusion 32 protrudes toward the rear surface of the housing 10 through the protrusion hole 15, thereby operating the braking member 60.

The operation effect of the stepless brake device according to the present invention will now be described.

When the passenger operates the operating lever, the input member 20 connected to the operating lever is rotated, and the sliding protrusion 23 of the input member 20 and the sliding groove 31 of the unlock member 30 work, and then the unlock member 30 moves toward the housing 10.

Accordingly, the unlock protrusion 32 of the unlock member 30 pushes the roller 62 while moving, and the roller 62 moves from the wedge surface 41a to the release surface 41b, and thus the fixed state of the gear member 50 by the roller 62 is released.

Therefore, the height of the seat can be adjusted as desired by the passenger. When a seat cushion moves up and down for adjusting the seat height, the gear member 50 maintains a state of being capable of freely rotating.

Then, when the passenger completes the seat height adjustment and releases the operating lever, the unlock member 30 and the input member 20 return to their original positions by the first spring 81 and the second spring 82, and the operating lever mounted on the input member 20 also returns to its original position. The roller 62 returns to the wedge surface 41a by the spring 61 and is fitted between the wedge surface 41a and the outer peripheral surface of the brake part 52, so that the gear member 50 is fixed.

Accordingly, as the rack gear of the seat-raising means meshed with the pinion gear 53 of the gear member 50 is fixed, the seat is switched into a locked state in which the seat is not able to move up and down.

On the other hand, in the stepless brake device according to the present invention, the input member 20 is inserted into the housing cover 90, and the housing cover 90 is restricted to the plate cover 70 through the medium of the coupling piece 71. The coupling piece 71 is provided on a plurality of places along the outer periphery of the device and exerts a strong coupling force, so that the separation strength of the input member 20 is significantly improved, thereby reliably preventing the separation of the input member 20. Accordingly, the axial separation of the operating lever mounted on the input member 20 is reliably prevented.

Also, in the state where the components constituting the stepless brake device are stacked in the axial direction and are compressed, caulking is performed on the caulking protrusion 72 of the end of the coupling piece 71, thereby maintaining the close contact between the components firmly even if an error occurs in the dimensions of the components.

That is, the caulking protrusion 72 deformed plastically by caulking maintains the state where the components of the device are compressed from both sides in the axial direction, thereby maintaining the close contact of the components as it is even when a pressing force applied during the assembly is removed. Accordingly, there is no axial gap between the various components constituting the device, and thus, the axial flow of the components is prevented.

As described above, by the structure in which there is no gap between the components, whether the roller 62 installed within the device flows in the axial direction is not affected at all by the assembled state of other components, but only by the thickness tolerance of the fixing member 40. That is, the possibility of axial flow of the roller 62 is reduced because tolerance accumulation by other components does not occur. Therefore, the tilt of the roller 62 at the initial stage of the release is reduced, thereby reducing collision noise between the roller 62 and the plate cover 70.

Also, since the concave round groove 32b is formed in the inclined surface 32a of the unlock protrusion 32, how much the corner of the roller 62 is pushed is reduced at the initial stage of the release in which the unlock protrusion 32 starts to push the roller 62 in the circumferential direction. Since the round groove 32b surrounds a portion of the outer peripheral surface of the roller 62 and the postural stability of the roller 62 is further improved, how much the roller 62 is tilted in the compression direction of the spring 61 is further reduced.

Accordingly, the amount of impact when the roller 62 collides with the plate cover 70 is further reduced, so that there is an effect that almost no collision noise is generated.

Meanwhile, in the unlock member 30, in addition to the fact that the unlock protrusion 32 is inserted into the protrusion hole 15 of the housing 10 and the operation path thereof is guided, the guide groove 32c is formed in the outer surface of the unlock protrusion 32 and the guide protrusion 16a formed on the border portion 16 of the housing 10 is inserted into the guide groove 32c. Accordingly, this prevents that the unlock protrusion 32 flows in the circumferential direction or is tilts with respect to the operation direction of the guide protrusion 16a.

Accordingly, the unlock member 30 moves accurately in the axial direction without tilting radially in one direction with respect to the central axis of the stepless brake device, so that the unlock member 30 can operate more smoothly.

As described above, although the present invention has been described with reference to the embodiment shown in the drawings, this is just an example and it will be understood by those skilled in the art that various modifications and equivalent thereto may be made. Therefore, the true technical scope of the present invention should be determined by the appended claims.

| REFERENCE NUMERALS | |
|---|---|
| 10: Housing | 16a: Guide Protrusion |
| 20: Input Member | 30: Unlock Member |
| 32: Unlock Protrusion | 32b: Round Groove |
| 32c: Guide Groove | 40: Fixing Member |
| 50: Gear Member | 60: Braking Member |
| 70: Plate Cover | 71: Coupling Piece |
| 72: Caulking Protrusion | 90: Housing Cover |
| 92: Catching Protrusion | 92a: Catching Surface |

What is claimed is:

1. A stepless brake device of a vehicle seat,
wherein an input member and an unlock member are disposed on one side of a housing, and a braking member, a fixing member, and a gear member are disposed on the other side of the housing,
wherein a housing cover surrounding the input member is disposed on the one side of the housing,
wherein a plate cover preventing separation of the braking member and the gear member is disposed on the other side of the housing,
wherein a plurality of coupling pieces formed on the plate cover is caulked and coupled to the housing cover in a state where the housing cover and the plate cover are compressed in a direction toward each other,
wherein the unlock member has a plurality of unlock protrusions formed around a circumference of the unlock member,
wherein corners on both sides of an end portion of the unlock protrusion are formed as inclined surfaces,
wherein a concave round groove is formed in each of the inclined surfaces,
wherein a straight guide groove is formed in a radially outer surface of the unlock member in an operation direction of the unlock member, and
wherein a straight guide protrusion which is inserted into the guide groove is formed on an inner surface of a border portion of the housing.

2. The stepless brake device of the vehicle seat of claim 1, wherein a pair of caulking protrusions is formed on an end portion of the coupling piece, wherein a pair of catching protrusions is formed on an outer peripheral surface of the housing cover, wherein an inclined catching surface is formed on each of the pair of catching protrusions, and wherein the coupling piece is inserted between the pair of side catching protrusions, and is caulked in a direction in which the pair of catching protrusions spread, and is caught by the respective inclined catching surface.

3. The stepless brake device of the vehicle seat of claim 2, wherein a protrusion by which the coupling piece is caught in a circumferential direction is formed on an outer peripheral surface of the housing.

4. The stepless brake device of the vehicle seat of claim 1, wherein a stopper protrusion is formed on a side of the input member and is inserted into an arc-shaped stopper hole defined in the housing cover to limit a rotation range of the input member.

5. The stepless brake device of the vehicle seat of claim 1, wherein a plurality of wedge surfaces and a plurality of release surfaces are alternatingly formed circumferentially on an inner periphery of the fixing member, and wherein a distance from a center point of the inner periphery to each of the plurality of wedges surfaces is shorter than a distance from the center point to each of the plurality of release surfaces.

* * * * *